(12) United States Patent
Liao

(10) Patent No.: US 7,282,970 B2
(45) Date of Patent: Oct. 16, 2007

(54) DEVICE AND METHOD FOR GENERATING ONE-SHOT BIPOLAR WAVEFORM

(75) Inventor: Tai-Shan Liao, Hsinchu (TW)

(73) Assignee: National Instrument Technology Research Center, Hsinchu (TW)

( * ) Notice: Subject to any disclaimer, the term of this patent is extended or adjusted under 35 U.S.C. 154(b) by 0 days.

(21) Appl. No.: 11/340,992

(22) Filed: Jan. 27, 2006

(65) Prior Publication Data

US 2006/0244497 A1    Nov. 2, 2006

(30) Foreign Application Priority Data

May 2, 2005    (TW)    ................................ 94114146 A

(51) Int. Cl.
*H03K 4/06* (2006.01)
*H03B 28/00* (2006.01)

(52) U.S. Cl. ...................... 327/131; 327/129; 327/130

(58) Field of Classification Search ................ 327/115, 327/117, 129–131, 164, 291

See application file for complete search history.

(56) References Cited

U.S. PATENT DOCUMENTS

| | | | | |
|---|---|---|---|---|
| 3,676,698 A | * | 7/1972 | Hunter | 327/132 |
| 4,443,713 A | * | 4/1984 | Layton | 327/100 |
| 4,599,703 A | * | 7/1986 | Bilharz | 708/845 |
| 4,665,372 A | * | 5/1987 | Schwartz | 332/100 |
| 6,483,356 B2 | * | 11/2002 | Suzuki et al. | 327/129 |
| 6,859,076 B2 | * | 2/2005 | Fujiwara | 327/129 |

* cited by examiner

*Primary Examiner*—Shuwang Liu
*Assistant Examiner*—Patrick O'Neill
(74) *Attorney, Agent, or Firm*—Volpe and Koenig, P.C.

(57) ABSTRACT

In the present invention, a device and method for generating one-shot bipolar waveforms are provided. The provided device can generate bipolar sawtooth waves, bipolar sinusoidal waves and bipolar square waves by employing a division circuit, an one-shot circuit, an analog switch and a synchro-trigger gate-controlled circuit.

37 Claims, 9 Drawing Sheets

DEVICE AND METHOD FOR GENERATING ONE-SHOT BIPOLAR WAVEFORM

FIELD OF THE INVENTION

The present invention relates to a device and a method for generating waveforms, more specifically to a device and a method for generating one-shot bipolar waveforms.

BACKGROUND OF THE INVENTION

The waveform-generating device is applied in a quite board range, for instance, the applications of physics, electrochemistry, NEMS/MEMS, material science and engineering, and so forth. It is required to utilize various signal waveforms for the mentioned applications, wherein the one-shot waveform is usable for achieving a more precise adjustment therefore.

The one-shot signal plays an important role in the accurate micro-stepping control application, wherein the bipolar sawtooth wave as well as the sinusoidal wave are more applicable than the common square waves for controlling certain materials and the piezoelectric component. In order to generate these complicated one-shot waveform signals, conventionally, a microprocessor is provided to proceed programming in ROM and coupled with a D/A converter to generate these signals. Whereas, the D/A converter has an inherent shortcoming in signal generation, that is, all of the waveforms are in form of discrete signals integrated by the stair-stepped digital signals. For instance, the ascending or descending slope waveform of the sawtooth wave is a stair-stepped non-linear waveform. Under the circumstance, it needs a filter to smoothen the signal. If the operating frequency of the sawtooth wave is in a range of large fluctuation, it is surely in opposition to the matching with the filter and to the application of the optimized response control.

Based on the above, in order to overcome the drawbacks in the prior art, the present invention provides an improved device and method for generating one-shot bipolar waveforms.

SUMMARY OF THE INVENTION

In accordance with a first aspect of the present invention, a one-shot bipolar waveform-generating device is provided. The provided one-shot bipolar waveform-generating device contains a clock waveform generation circuit generating a square wave as a basic clock frequency, an inverted square wave and a triangle wave, a divisor circuit electrically connected to the clock waveform generation circuit for generating a clock signal in response to the inverted square wave, a one-shot circuit for generating a trigger signal, a clock synchronizing gate-controlled trigger generation circuit electrically connected to the divisor circuit and the one-shot circuit and generating a gate-controlled signal with a duty cycle representing a twice of a basic clock frequency in response to the clock signal and the trigger signal, thereby a rising edge of the gate-controlled signal synchronized with a rising edge of the basic clock frequency to cut a cycle of the clock frequency, a level adjustment circuit electrically connected to the clock waveform generation circuit for adjusting a level of the triangle wave, an analog switch electrically connected to the clock synchronizing gate-controlled trigger generation circuit and the level adjustment circuit to receive the square wave and controlled by the gate-controlled signal to generate a sawtooth wave with a positive polarity and a negative slope and a sawtooth wave with a positive polarity and a positive slope, a first inverter electrically connected to the analog switch for inverting the sawtooth wave with the positive polarity and the positive slope to an inverted sawtooth wave, and an adder electrically connected to the inverter for generating a bipolar sawtooth wave with a negative slope in response to the sawtooth wave with the positive polarity and the negative slope and the inverted sawtooth wave.

Preferably, the clock waveform generation circuit includes two operating amplifiers.

Preferably, the divisor circuit is a divide-by-two circuit.

Preferably, the level adjustment circuit includes an adjustable DC voltage and an operating amplifier.

Preferably, the triangle wave is adjusted by the level adjustment circuit to a reference point at 0V.

Preferably, the analog switch is a dual-channel analog switch.

Preferably, the dual-channel analog switch includes a first analog switch and a second analog switch.

Preferably, the first analog switch is conducted for outputting the sawtooth wave with the positive polarity and the negative slope when the basic clock frequency is relatively high.

Preferably, the second analog switch is conducted for outputting the sawtooth wave with the positive polarity and the positive slope when the basic clock frequency is relatively low.

Preferably, the one-shot bipolar waveform-generating device further contains a second inverter electrically connected to the adder for inverting the bipolar sawtooth wave with the negative slope to generate a bipolar sawtooth wave with a positive slope.

In accordance with a second aspect of the present invention, a one-shot bipolar waveform-generating device is provided. The one-shot bipolar waveform-generating device contains a clock waveform generation circuit generating a square wave as a basic clock frequency and a triangle wave, a divisor circuit electrically connected to the clock waveform generation circuit for generating a clock signal in response to the square wave, a one-shot circuit for generating a trigger signal, a clock synchronizing gate-controlled trigger generation circuit electrically connected to the divisor circuit and the one-shot circuit, and generating a gate-controlled signal with a duty cycle representing a twice of a basic clock frequency in response to the clock signal and the trigger signal, thereby a rising edge of the gate-controlled signal synchronized with a rising edge of the basic clock frequency to cut a cycle of the clock frequency, a filter electrically connected to the clock waveform generation circuit for generating a sinusoidal wave in response to the square wave, a level adjustment circuit electrically connected to the filter for adjusting a level of the sinusoidal wave, an analog switch electrically connected to the clock synchronizing gate-controlled trigger generation circuit and the level adjustment circuit to receive the square wave and controlled by the gate-controlled signal to generate a single-cycle bipolar sinusoidal wave with a positive half cycle at a beginning thereof, and an inverter electrically connected to the analog switch for inverting the single-cycle bipolar sinusoidal wave with the positive half cycle at the beginning thereof to generate a single-cycle bipolar sinusoidal wave with a negative half cycle at a beginning thereof.

Preferably, the clock waveform generation circuit contains two operating amplifiers.

Preferably, the divisor circuit is a divide-by-two circuit.

Preferably, the filter is a low-pass filter.

Preferably, the level adjustment circuit includes an adjustable DC voltage and an operating amplifier.

Preferably, the sinusoidal wave is adjusted by the level adjustment circuit to a symmetrical sinusoidal wave with a reference point at 0V.

In accordance with a third aspect of the present invention, a one-shot bipolar waveform-generating device is provided. The one-shot bipolar waveform-generating device contains a clock waveform generation circuit generating a square wave as a basic clock frequency and a triangle wave, a divisor circuit electrically connected to the clock waveform generation circuit for generating a clock signal in response to the square wave, an one-shot circuit for generating a trigger signal, a clock synchronizing gate-controlled trigger generation circuit electrically connected to the divisor circuit and the one-shot circuit, and generating a gate-controlled signal with a duty cycle representing a twice of a basic clock frequency in response to the clock signal and the trigger signal, thereby a rising edge of the gate-controlled signal synchronized with a rising edge of the basic clock frequency to cut a cycle of the clock frequency, a level adjustment circuit electrically connected to the clock synchronizing gate-controlled trigger generation circuit for adjusting a level of the square wave, an analog switch electrically connected to the clock synchronizing gate-controlled trigger generation circuit and the level adjustment circuit to receive the square wave and controlled by the gate-controlled signal to generate a single-cycle bipolar square wave with a positive polarity at a beginning thereof, and an inverter electrically connected to the analog switch for inverting the single-cycle bipolar square wave with the positive polarity at the beginning thereof to a single-cycle bipolar square wave with a negative polarity at a beginning thereof.

Preferably, the clock waveform generation circuit includes two operating amplifiers.

Preferably, the divisor circuit is a divide-by-two circuit.

Preferably, the level adjustment circuit includes an adjustable DC voltage and an operating amplifier.

Preferably, the square wave is adjusted by the level adjustment circuit to a symmetrical square wave with a reference point at 0V.

In accordance with a fourth aspect of the present invention, a method for generating a one-shot bipolar waveform is provided. The method for generating a one-shot bipolar waveform contains steps of providing a square wave as a basic clock frequency, an inverted square wave, a triangle wave and a trigger signal, dividing the inverted square wave into a divided square wave, generating a control signal in response to the divided square wave and the trigger signal, wherein the control signal has a duty cycle representing a twice of the basic clock frequency, a rising edge of the control signal is synchronized with a rising edge of the basic clock frequency so as to cut a cycle of the basic clock frequency, adjusting a level of the triangle wave to form an adjusted triangle wave and transmitting the adjusted triangle wave to an analog switch, generating a sawtooth wave with a positive polarity and a negative slope and a sawtooth wave with a positive polarity and a positive slope in response to the square wave and the control signal by means of the analog switch, inverting the sawtooth wave with the positive slope to an inverted sawtooth wave, and adding the inverted sawtooth wave to the sawtooth wave with the negative slope to generate a bipolar sawtooth wave with a negative slope.

Preferably, the inverted square wave is divided by 2.

Preferably, the triangle wave is adjusted to a reference point at 0V.

Preferably, the analog switch is a dual-channel analog switch.

Preferably, the dual-channel analog switch has a first analog switch and a second analog switch.

Preferably, the first analog switch is conducted for outputting the sawtooth wave with the positive polarity and the negative slope when the basic clock frequency is relatively high.

Preferably, the second analog switch is conducted for outputting the sawtooth wave with the positive polarity and the positive slope when the basic clock frequency is relatively low.

Preferably, the method for generating a one-shot bipolar waveform further contains a step of inverting the bipolar sawtooth wave with the negative slope to generate a bipolar sawtooth wave with a positive slope.

In accordance with a fifth aspect of the present invention, a method for generating a one-shot bipolar waveform is provided. The method for generating a one-shot bipolar waveform contains steps of providing a square wave as a basic clock frequency, a triangle wave and a trigger signal, dividing the square wave into a divided square wave, generating a control signal in response to the divided square wave and the trigger signal, wherein the control signal has a duty cycle representing a twice of the basic clock frequency, a rising edge of the control signal is synchronized with a rising edge of the basic clock frequency so as to cut a cycle of the basic clock frequency, converting the square wave into a sinusoidal wave, adjusting a level of the sinusoidal wave to form an adjusted sinusoidal wave and transmitting the adjusted sinusoidal wave to an analog switch, and generating a single-cycle bipolar sinusoidal wave with a positive half cycle at a beginning thereof in response to a control of the adjusted sinusoidal wave and the control signal by means of the analog switch.

Preferably, the square wave is divided by 2.

Preferably, the sinusoidal wave is adjusted to a symmetrical sinusoidal wave with a reference point at 0V.

Preferably, the method for generating a one-shot bipolar waveform further contains a step of inverting the single-cycle bipolar sinusoidal wave with the positive half cycle at the beginning thereof to generate a single-cycle bipolar sinusoidal wave with a negative half cycle at a beginning thereof.

In accordance with a sixth aspect of the present invention, a method for generating a one-shot bipolar waveform is provided. The method for generating a one-shot bipolar waveform contains steps of providing a square wave as a basic clock frequency, a triangle wave and a trigger signal, dividing the square wave into a divided square wave, generating a control signal in response to the divided square wave and the trigger signal, wherein the control signal has a duty cycle representing a twice of the basic clock frequency, a rising edge of the control signal is synchronized with a rising edge of the basic clock frequency so as to cut a cycle of the basic clock frequency, adjusting a level of the square wave to form an adjusted square wave and transmitting the adjusted square wave to an analog switch, and generating a single-cycle bipolar square wave with a positive polarity at a beginning thereof in response to a control of the adjusted square wave and the control signal by means of the analog switch.

Preferably, the square wave is divided by 2.

Preferably, the square wave is adjusted to a symmetrical square wave with a reference point at 0V Preferably, the method for generating a one-shot bipolar waveform further contains a step of inverting the single-cycle bipolar square wave with the positive polarity at the beginning thereof to generate a single-cycle bipolar square wave with a negative polarity at a beginning thereof.

The foregoing and other features and advantages of the present invention will be more clearly understood through the following descriptions with reference to the drawing, wherein:

DETAILED DESCRIPTION OF THE PREFERRED EMBODIMENT

Figure 1:
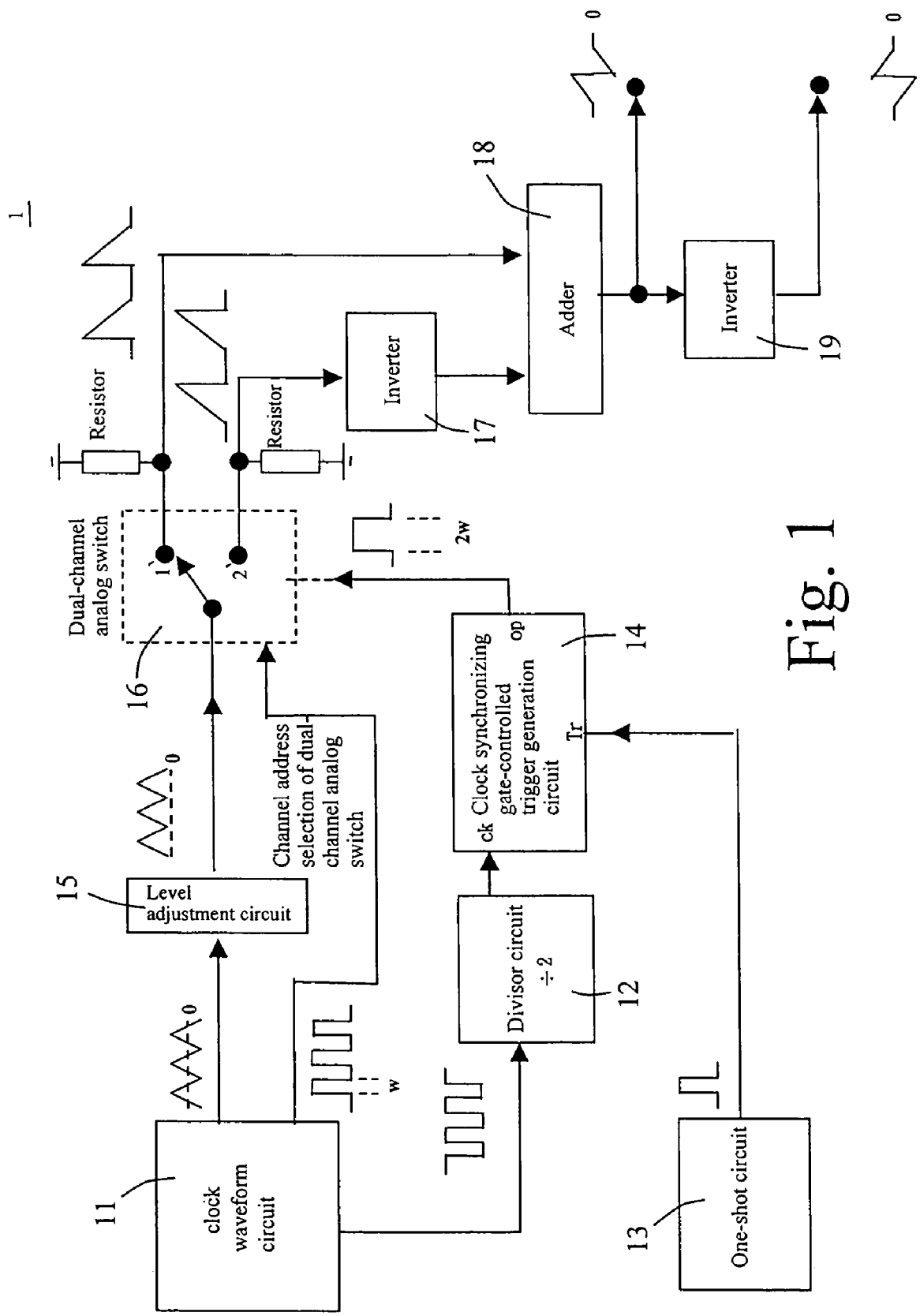
FIG. 1 is a circuit block diagram showing a device for generating one-shot bipolar sawtooth waveform according to a preferred embodiment of the present invention.

Please refer to FIG. 1 showing the device for generating one-shot bipolar sawtooth waveforms according to a preferred embodiment of the present invention. The device 1 for generating one-shot bipolar sawtooth waveforms contains a clock waveform generation circuit 11, a divisor circuit 12, a one-shot circuit 13, a clock synchronizing gate-controlled trigger generation circuit 14, a level adjustment circuit 15, a dual-channel analog switch 16, two first inverters 17, 19, and an adder 18.

First of all, the clock waveform generation circuit 11 generates a square wave and a triangle wave, which are synchronized. The square wave acts as a basic clock signal and the clock signal also acts as an address selection signal for the dual-channel analog switch. The basic clock signal is inverted and outputted to the divisor circuit 12 (a divide-by-two circuit in the embodiment) to generate a further clock signal. The one-shot circuit 13 is used to generate a trigger signal, and the clock synchronizing gate-controlled trigger generation circuit 14 generates a gate-controlled signal whose duty cycle is twice of the time for the basic clock frequency in response to the clock signal and the trigger signal so as to control the dual-channel analog switch 16. The rising edge of the gate-controlled signal is synchronized with the rising edge of the inverted basic clock frequency, so as to ensure to cut a cycle of the basic clock frequency. To generate a bipolar sawtooth wave, the triangle wave generated by the clock waveform circuit 11 would go through the level adjustment circuit 15 for the level adjustment, thereby the triangle wave is adjusted to have the reference point at 0V, and then transmitted to the dual-channel analog switch 16 for input. While the dual-channel analog switch 16 is controlled by the gate-controlled signal and the basic clock signal is at a high state, the channel 1' of the dual analog switch 16 is conducted to output a sawtooth wave with a positive polarity and a negative slope. On the other hand, while the basic clock frequency is at low state, the channel 2' of the dual analog switch 16 is conducted to output a sawtooth wave with a positive polarity and a positive slope. The sawtooth wave with the positive polarity and the positive slope is inverted through the inverter 17 and then is outputted to the adder 18 along with the sawtooth wave with the positive polarity and the negative slope outputted from the channel 1' of the bipolar analog switch 16 to generate a bipolar sawtooth wave with negative slope. The bipolar sawtooth wave with the negative slope is further inverted by the inverter 19 to generate a bipolar sawtooth wave with a positive slope.

Figure 2:
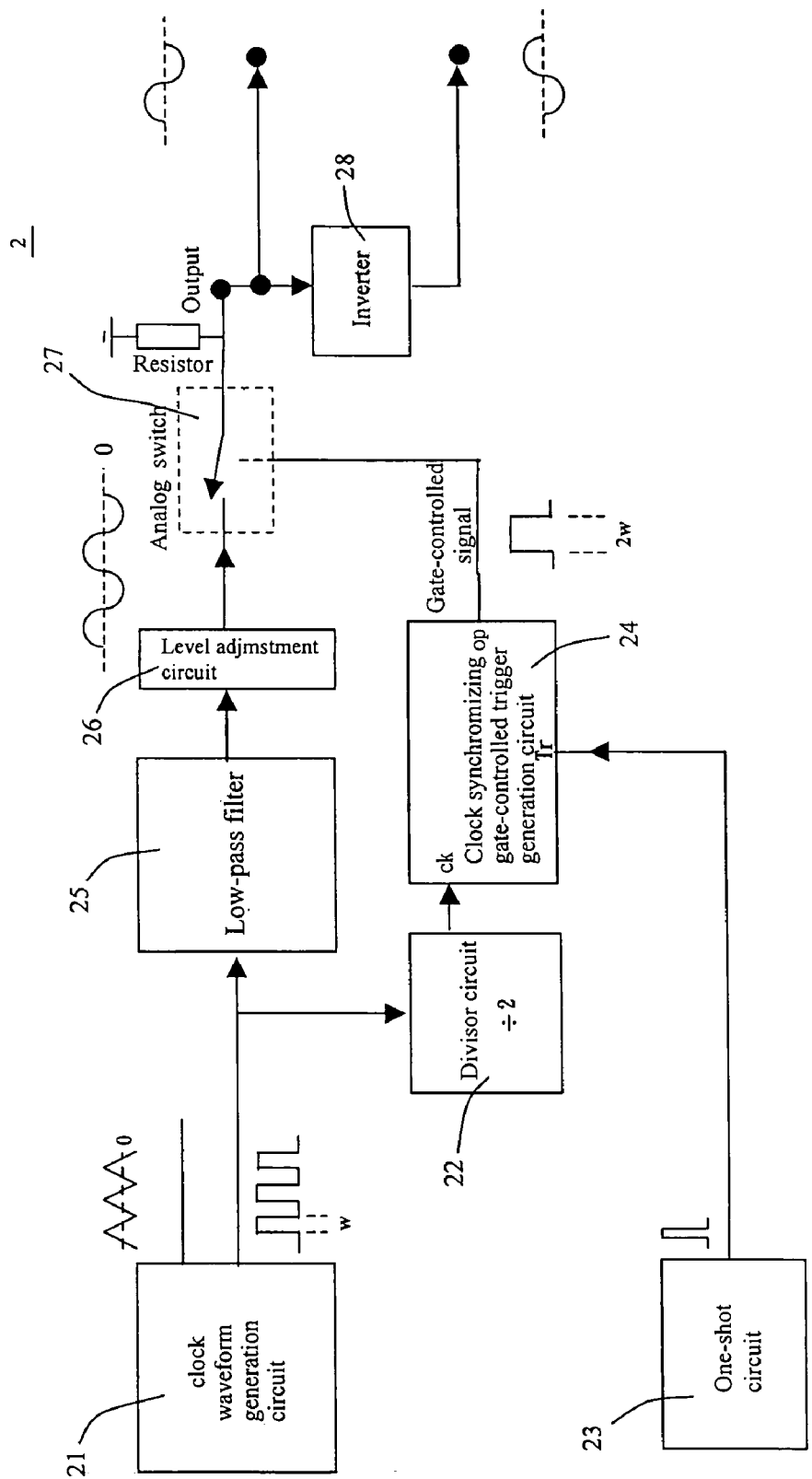
FIG. 2 is a circuit block diagram showing a device for generating one-shot bipolar sinusoidal waveform of an embodiment of the present invention.

Please refer to FIG. 2, which is a circuit block diagram showing the device for generating one-shot bipolar sinusoidal waveforms according to a preferred embodiment of the present invention. The device 2 for generating one-shot bipolar sinusoidal waveforms contains a clock waveform generation circuit 21, a divisor circuit, a one-shot circuit 23, a clock synchronizing gate-controlled trigger generation circuit 24, a low-pass filter 25, a level adjustment circuit 26, an analog switch 27 and an inverter 28.

First of all, the clock waveform generation circuit 21 generates a square wave and a triangle wave synchronized with each other, wherein the square wave acts as a basic clock signal and is outputted to the divisor circuit 22 (a divide-by-two circuit in the embodiment) to generate a further clock signal. The one-shot circuit 23 is used to generate a trigger signal and the clock synchronizing gate-controlled trigger generation circuit 24 generates a gate control signal with a duty cycle representing a twice of a basic clock frequency in response to the clock signal and the trigger signal to control the analog switch 27. The rising edge of the gate-controlled signal is synchronized with the rising edge of the basic clock frequency so as to ensure to cut a cycle of the basic clock frequency. To generate a bipolar square wave, the square wave generated by the clock waveform generation circuit 21 first goes through the low-pass filter 25 to generate a sinusoidal wave. In the next the sinusoidal wave further goes through the level adjustment circuit 26 for level adjustment so that the sinusoidal wave is adjusted to be symmetric to the reference point at 0V for being transmitted to the input of the analog switch 27. The analog switch is controlled by the gate-controlled signal to output a single-cycle bipolar sinusoidal wave with a positive half cycle at a beginning thereof. After the single-cycle bipolar sinusoidal wave with a positive half cycle at a beginning thereof is further inverted by the inverter 28, a single-cycle bipolar sinusoidal wave with a negative half cycle at a beginning thereof is generated.

Figure 3:
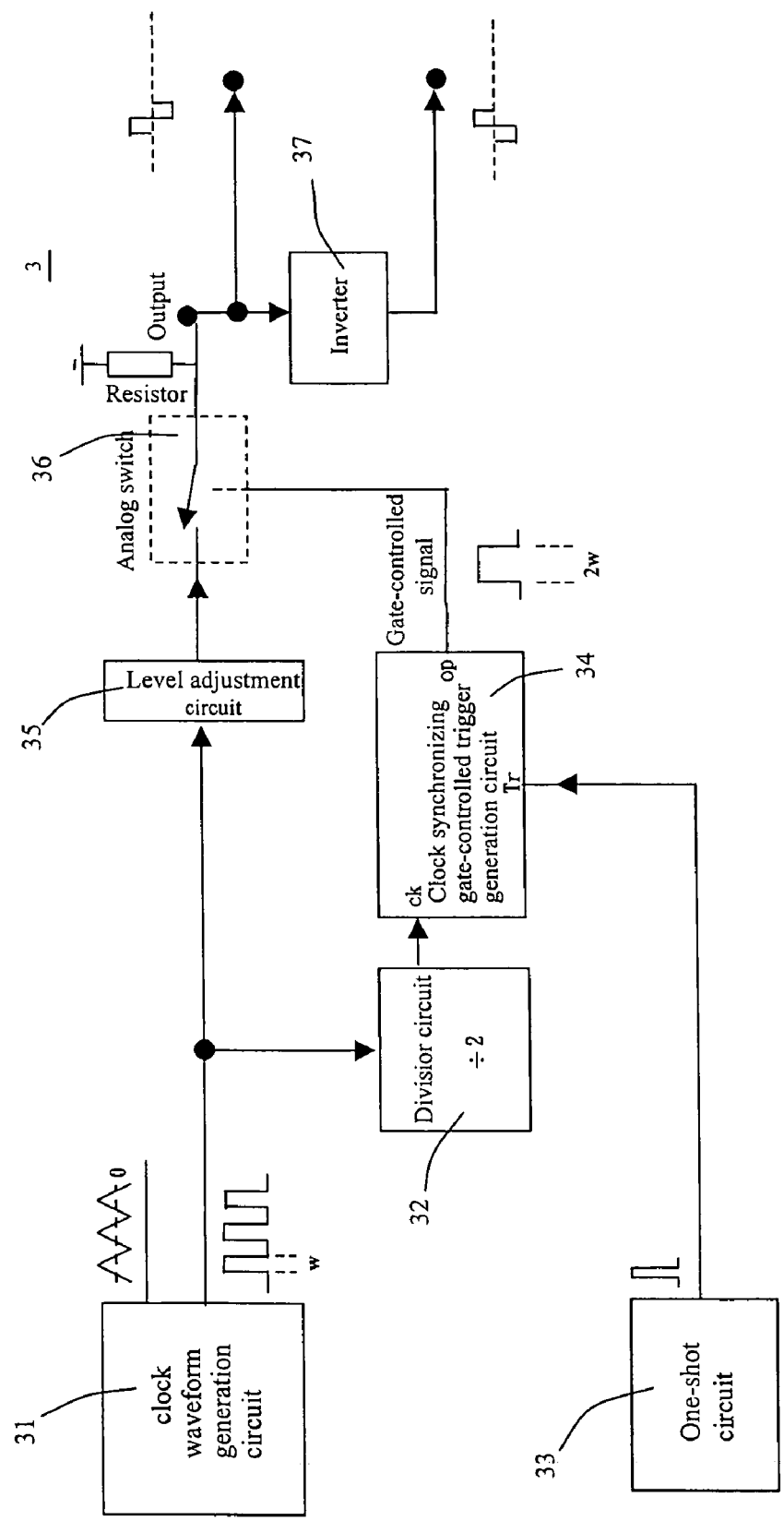
FIG. 3 is a circuit block diagram showing the device generating one-shot bipolar square waveform according to a preferred embodiment of the present invention.

Please refer to FIG. 3 showing the circuit block diagram of the device for generating one-shot bipolar square waveform according to a preferred embodiment of the present invention. The device 3 for one-shot bipolar square waveform includes a clock waveform generation circuit 31, a divisor circuit 32, an one-shot circuit 33, a clock synchronizing gate-controlled trigger generation circuit 34, a level adjustment circuit 35, an analog switch 36 and an inverter 37.

Firstly, the clock waveform generation circuit 31 generates synchronizing square wave and triangle wave, which the square is functioned as a basic clock frequency for being inputted to the divisor circuit 32 (a divide-by-two circuit in the preferred embodiment) in generation of a clock signal. The one-shot circuit 33 is used to generate a trigger signal. Accordingly, in response to the clock signal and the trigger signal, the clock synchronizing gate-controlled trigger generation circuit 34 generates a gate-controlled signal with two folds of time of the basic clock signal width to control the analog switch 36. The rising edge of the gate-controlled signal synchronizes with the rising edge of the basic clock signal so as to ensure a precise cut of one cycle of the basic clock signal. For sake of generating a bipolar square wave, the square wave generated by the clock waveform generation circuit 31 goes through the level adjustment circuit 35 first for the level adjustment so that the square wave is adjusted to be symmetric to the reference point at 0V for being transmitted to the input of the analog switch 36. The analog switch 36 is controlled by the gate-controlled signal to output a single-cycle bipolar square wave with a positive polarity at a beginning. After the single-cycle bipolar square wave with a positive polarity at a beginning is inverted by the inverter 37, a single-cycle bipolar square wave with a negative polarity at a beginning is generated.

Figure 4A:
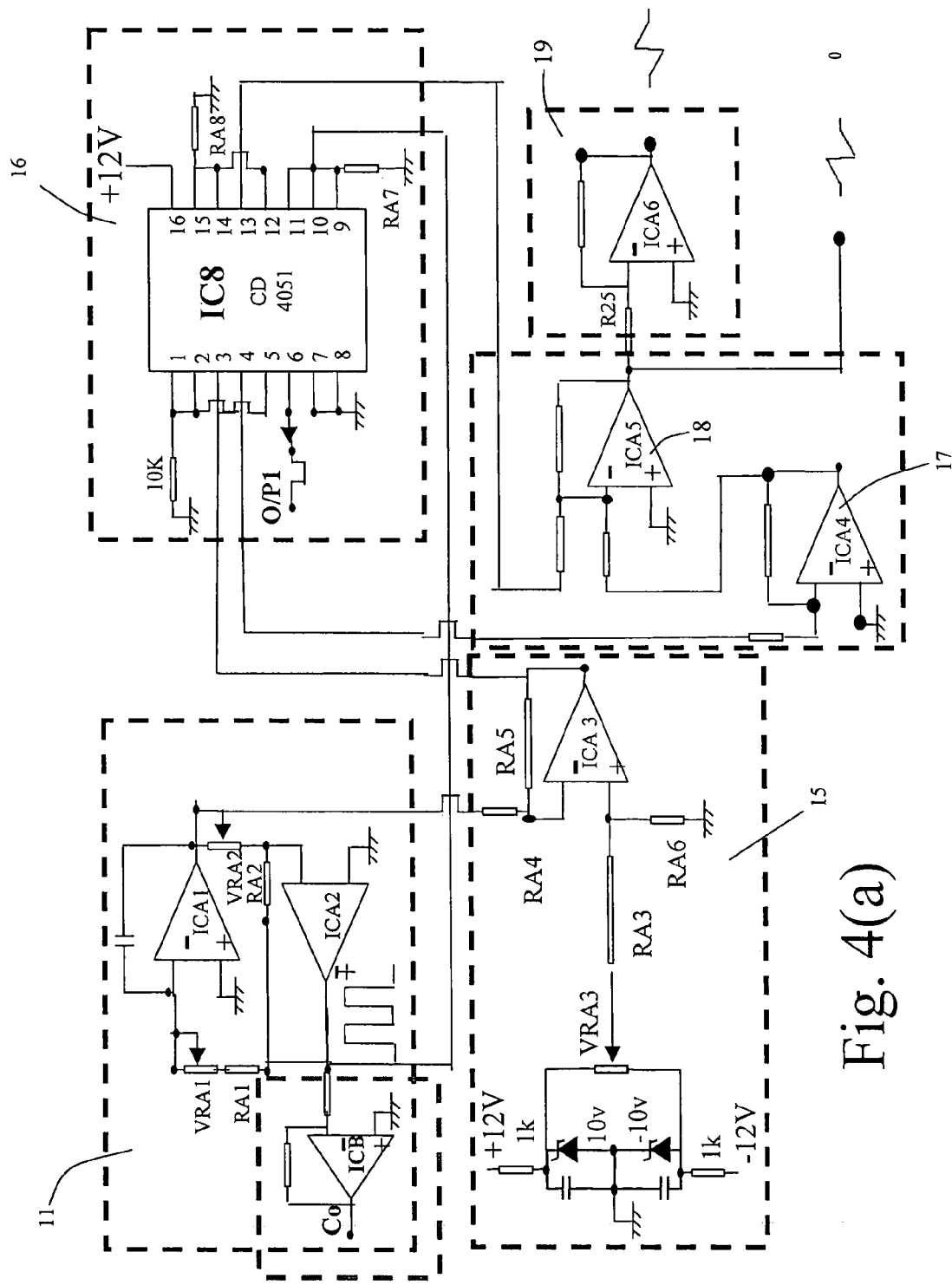
FIG. 4(a) and 4(b) are the detailed circuit diagrams of the device of FIG. 1.

Please refer to FIG. 4 (a) and 4(b) showing the detailed circuit diagram of the device for generating one-shot bipolar sawtooth waveforms in FIG. 1. As shown in FIG. 4 (a), the clock waveform circuit 11 is composed of two operating amplifiers (ICA1 and ICA2) capable of simultaneously generating the synchronized square wave and triangle wave and an inverter (ICB) inverting and transmitting the square wave to the divisor circuit 12 (ICA9). The level adjustment circuit 15 employs a differential amplifier composed of an adjustable DC voltage source and an operating amplifier so that the valley of the triangle wave generated by the clock waveform generation circuit 11 is adjusted above 0V and then transmitted to the common input terminal of the dual-channel analog switch 16. The square wave outputted to the dual-channel analog switch 16 serves for the address selection of analog channel switch. The channel 1 of the dual-channel analog switch 16 is conducted when the voltage of the square wave is high. Otherwise, the channel 1 of the dual-channel analog switch is not conducted, and instead the channel 2 of the dual-channel analog switch is conducted when the voltage of the square wave is low. The dual-channel analog switch 16 can accurately divide the triangle wave in half at the vertex. If the output of the channel 1 of the dual-channel analog switch 16 is a sawtooth waveform with positive polarity and negative slope, the output of the channel 2 of the dual-channel analog switch 16 would be a sawtooth waveform with positive polarity and positive slope. The sawtooth waveform with positive polarity and positive slope outputted by the channel 2 of the dual-channel analog switch 16 is inverted by the inverter 17 (ICA4) and then transmitted to the adder 18 (ICA5) together with the sawtooth waveform with positive polarity and negative slope outputted by the channel 1 of the dual-channel analog switch 16, so as to generate a bipolar sawtooth waveform and further generate a bipolar sawtooth waveform with a slope of opposite direction if inverted by the inverter 19 (ICA6).

Figure 4B:
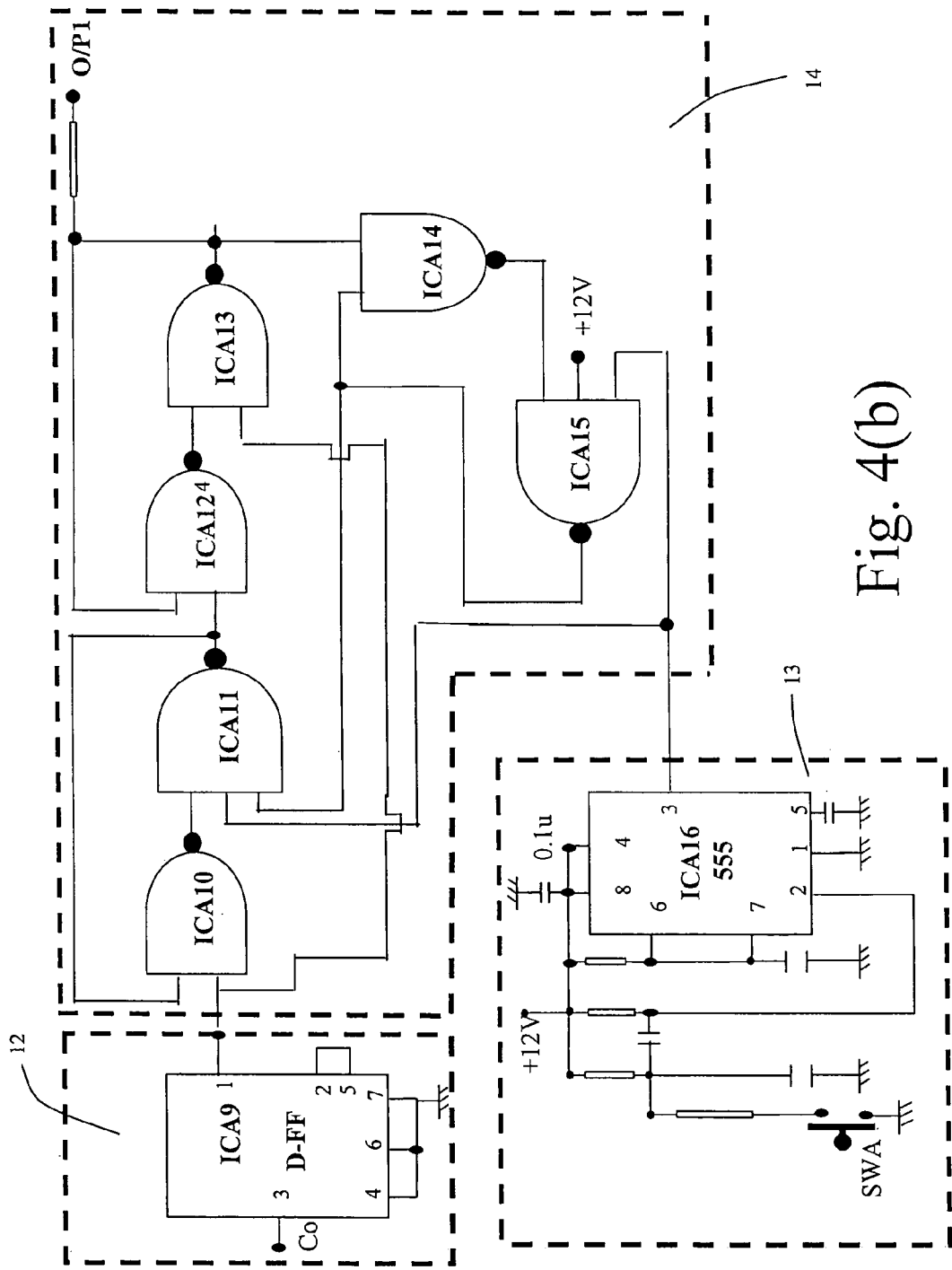

The divisor circuit 12(ICA9) shown in FIG. 4(b) is a divide-by-two circuit, which receives the inverted square wave generated by the clock waveform circuit 11 and generates the pulse wave covering the cycle width of the clock waveform. Subsequently, the pulse wave is further transmitted to the clock synchronizing gate-controlled trigger generation circuit 14 (ICA10, ICA11, ICA12, ICA13, ICA14, ICA15) together with the trigger signal generated by the one-shot circuit 13(ICA16) so as to generate the gate-controlled signal with a duty cycle representing a twice of a basic clock frequency for controlling the dual-channel analog switch 16. The rising edge of the gate-controlled signal is synchronized with the rising edge of the inverted square wave of the basic clock frequency so as to ensure to precisely cut a cycle of the basic clock frequency signal. Therefore, the one-shot bipolar sawtooth waveform could be accurately generated by simply switching on the one-shot circuit 13.

Figure 5A:
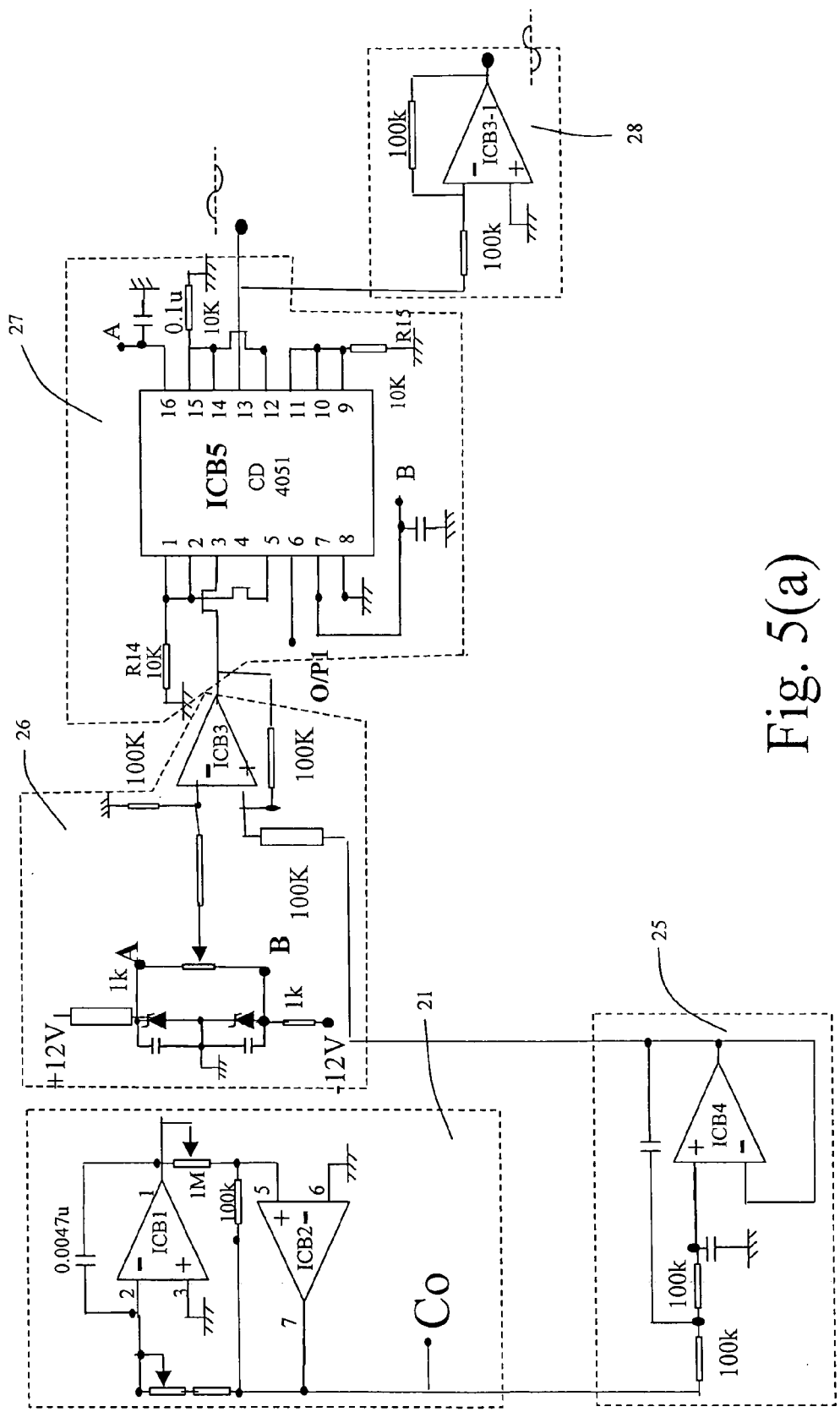
FIG. 5(a) and 5(b) are the detailed circuit diagrams of the device of FIG. 2.
Figure 5B:
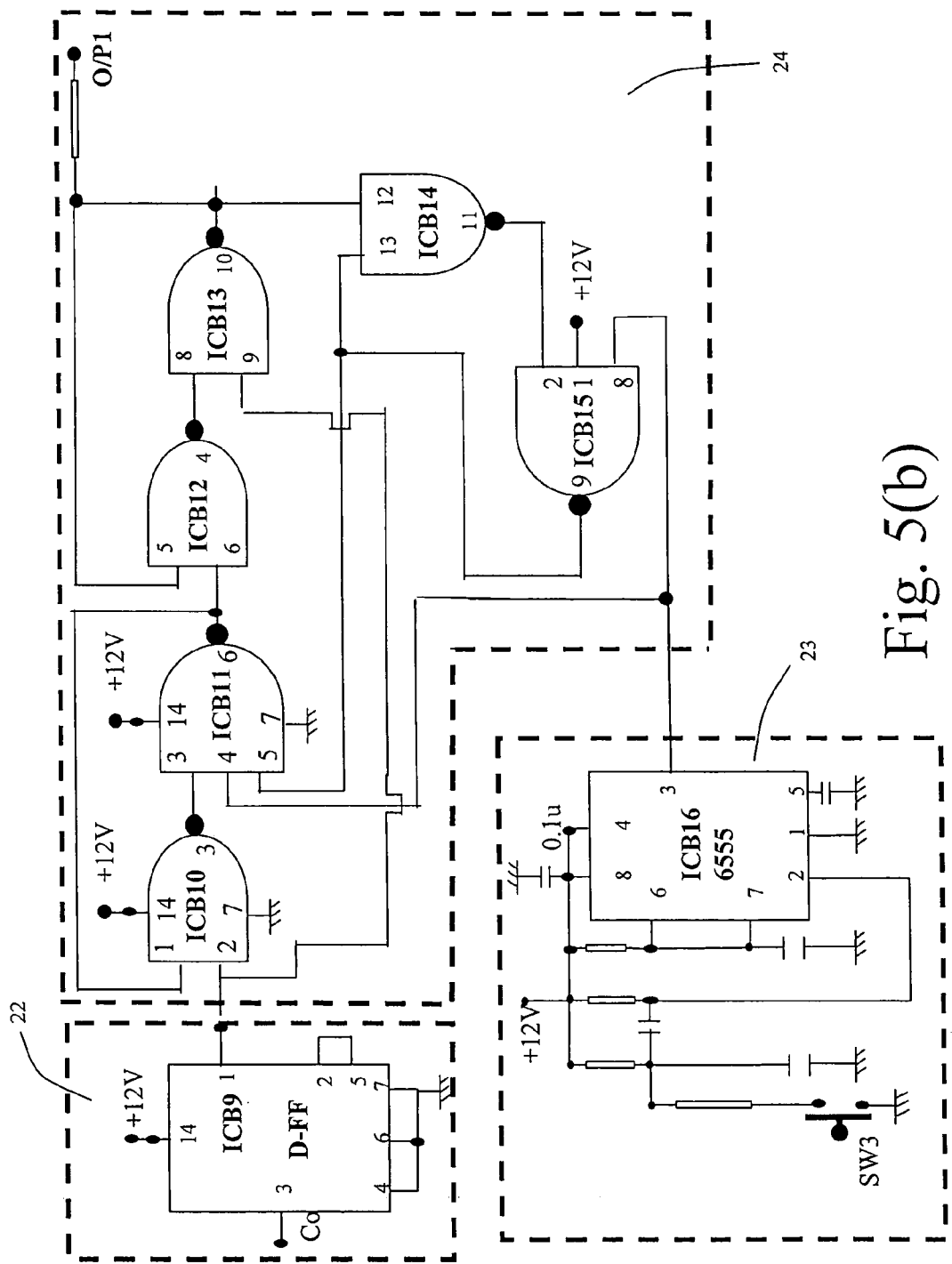

Please refer to FIG. 5(a) and 5(b) showing the detailed circuit diagram of the device 2 for generating one-shot bipolar sinusoidal waveforms in FIG. 2. The clock waveform generation circuit 21 is composed of two operating amplifiers (ICB1 and ICB2) capable of generating variable-frequency square wave. After the square wave goes through the low-pass filter 25 (ICB4) composed of the operating amplifiers, a sinusoidal wave is generated. The level adjustment circuit 26 shown in FIG. 5(a) employs the differential amplifier composed of an adjustable DC voltage source and an operating amplifier (ICB3) to adjust the sinusoidal wave in a way that the upper part is symmetric to the lower part with a reference point at 0V and then the square wave is transmitted to the input terminal of the analog switch 27. Besides, the square wave is further transmitted to the divisor circuit 22 (ICB9), which is a divide-by-two circuit receiving the square wave generated by the clock waveform generation circuit 21, generating the pulse wave covering the cycle width of the clock waveform, and transmitting the pulse wave together with the trigger signal generated by the one-shot circuit 23 (ICB16) to the clock synchronizing gate-controlled trigger generation circuit 24 (ICB10, ICB11, ICB12, ICB13, ICB14, ICB15), so as to generate the gate-controlled signal with a duty cycle representing a twice of a basic clock frequency for controlling the analog switch 27. The rising edge of the gate-controlled signal is synchronized with the rising edge of the basic clock frequency so as to ensure to cut a cycle of a sinusoidal waveform of the basic clock frequency signal. As such, the one-shot bipolar sinusoidal waveform is able to be accurately generated by simply switching on the one-shot circuit 23. After inverting the one-shot bipolar sinusoidal waveform with the inverter 28 (ICS3-1), a one-shot bipolar sinusoidal waveform with inverted polarity can be obtained.

Figure 6A:
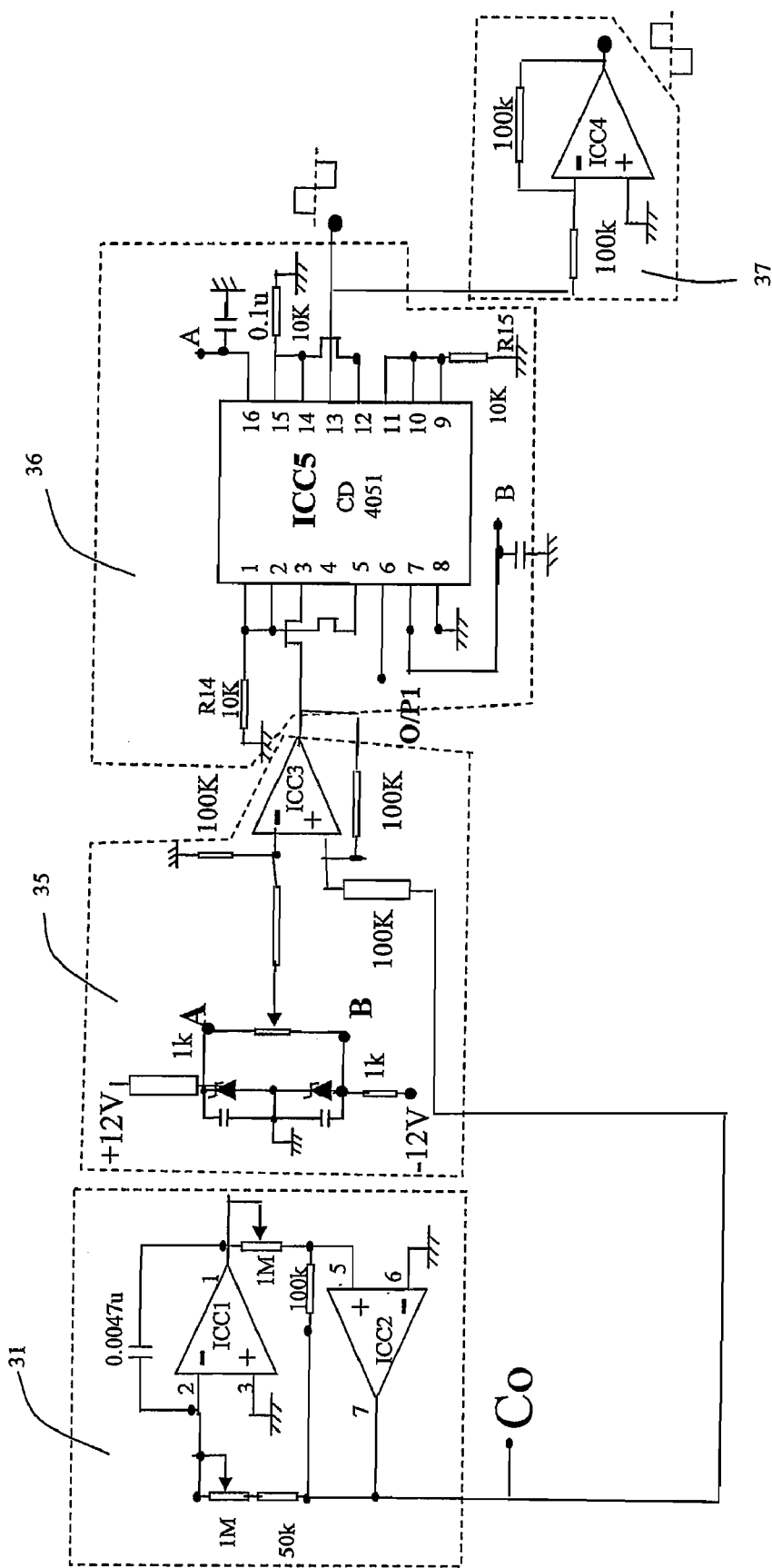
FIG. 6(a) and 6(b) are the detailed circuit diagrams of the device of FIG. 3.
Figure 6B:
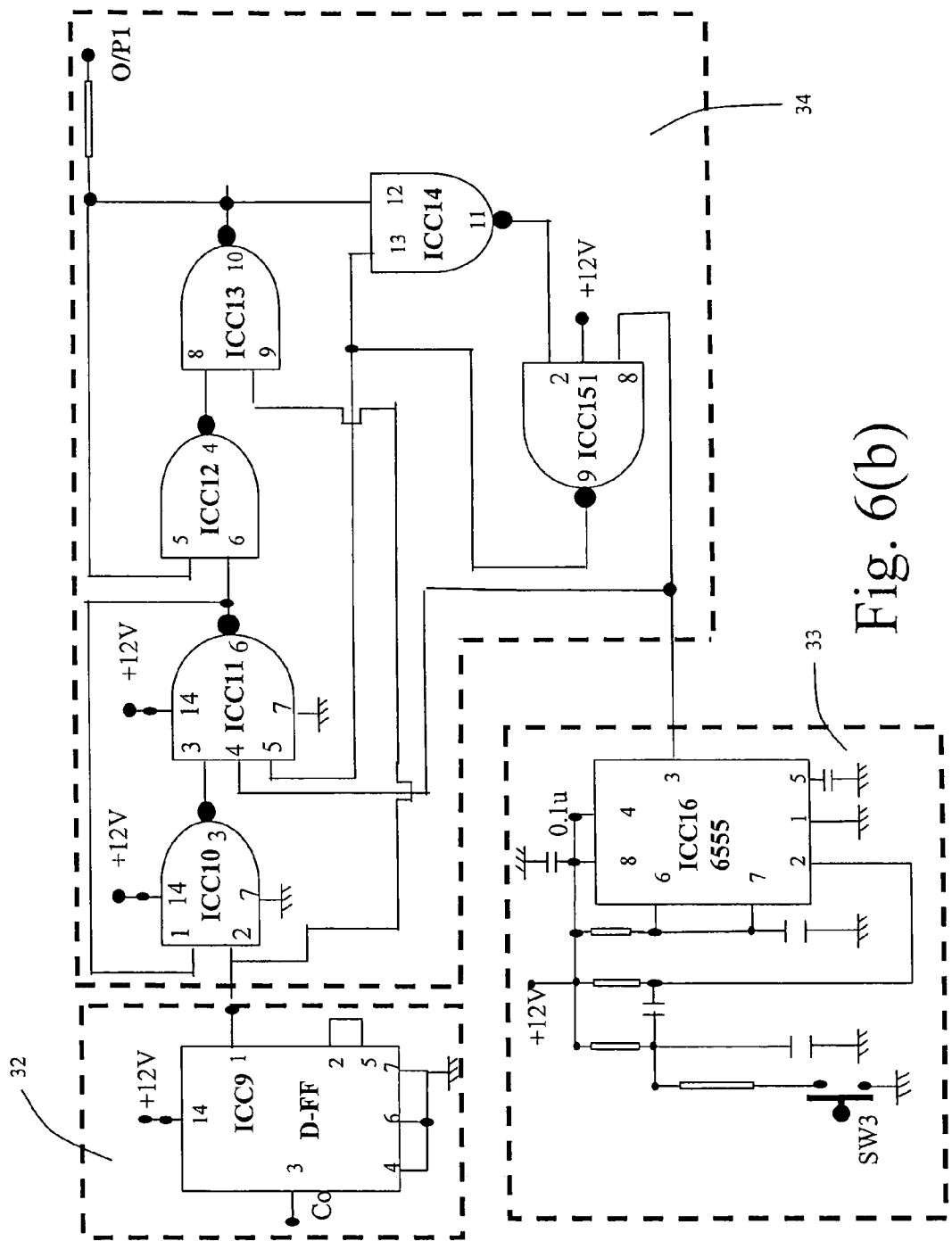

Please refer to FIG. 6(a) and 6(b) showing the detailed circuit diagram of the device 3 for generating one-shot bipolar waveform in FIG. 3. The clock waveform generation circuit 31 is composed of two operating amplifiers (ICC1 and ICC2) capable of generating variable-frequency square waves. The level adjustment circuit 35 as shown in FIG. 6(a) employs a differential amplifier composed of an adjustable DC voltage source and an operating amplifier (ICC3) to adjust the square wave in a way that the upper part is symmetric to the lower part with a reference point at 0V and the square wave is transmitted to the input terminal of the analog switch 36. Besides, the square wave is further transmitted to the divisor circuit 32 (ICC9), which is a divide-by-two circuit receiving the square wave generated by the clock generation circuit 31, generating the pulse wave covering the cycle width of the clock waveform, and transmitting the pulse wave together with the trigger signal generated by the one-shot circuit 33 (ICC16) to the clock synchronizing gate-controlled trigger generation circuit 34 (ICC10, ICC11, ICC12, ICC13, ICC14, ICC15), so as to generate a gate-controlled signal with a duty cycle representing a twice of a basic clock frequency for controlling the analog switch 36. The rising edge of the gate-controlled signal is synchronized with the rising edge of the basic clock frequency so as to ensure to precisely cut a square wave cycle of the basic clock frequency signal. Therefore, the one-shot bipolar square wave is able to be accurately generated by simply switching on the one-shot circuit 33. After inverting the one-shot bipolar square waveform with the inverter 37 (ICC4), a one-shot bipolar square waveform with an inverted polarity can be obtained.

In summary, the present invention provides a device and a method for generating one-shot bipolar waveform to design the one-shot bipolar waveform, which could continuously vary frequency width to enhance the optimized response control of circuit application and effectively improve the drawback of the conventional technique, by adopting the analog component and time sequence switch technique, and thus the present invention is innovative, progressive and practical.

While the invention has been described in terms of what are presently considered to be the most practical and preferred embodiments, it is to be understood that the invention need not to be limited to the disclosed embodiment. On the contrary, it is intended to cover various modifications and similar arrangements included within the spirit and scope of the appended claims, which are to be accorded with the broadest interpretation so as to encompass all such modifications and similar structures.

What is claimed is:

1. A one-shot bipolar waveform-generating device, comprising:
    a clock waveform generation circuit generating a square wave as a basic clock frequency, an inverted square wave and a triangle wave;
    a divisor circuit electrically connected to said clock waveform generation circuit for generating a clock signal in response to said inverted square wave;
    a one-shot circuit for generating a trigger signal;
    a clock synchronizing gate-controlled trigger generation circuit electrically connected to said divisor circuit and said one-shot circuit, and generating a gate-controlled signal with a duty cycle representing a twice of said basic clock frequency in response to said clock signal and said trigger signal, thereby a rising edge of said gate-controlled signal synchronized with a rising edge of said basic clock frequency to cut a cycle of said basic clock frequency;
    a level adjustment circuit electrically connected to said clock waveform generation circuit for adjusting a level of said triangle wave;
    an analog switch electrically connected to said clock synchronizing gate-controlled trigger generation circuit and said level adjustment circuit to receive said square wave, and controlled by said gate-controlled signal to generate a sawtooth wave with a positive polarity and a negative slope and a sawtooth wave with a positive polarity and a positive slope;
    a first inverter electrically connected to said analog switch for inverting said sawtooth wave with said positive polarity and said positive slope to an inverted sawtooth wave; and
    an adder electrically connected to said first inverter for generating a bipolar sawtooth wave with a negative slope in response to said sawtooth wave with said positive polarity and said negative slope and said inverted sawtooth wave.

2. The one-shot bipolar waveform-generating device of claim 1, wherein said clock waveform generation circuit comprises two operating amplifiers.

3. The one-shot bipolar waveform-generating device of claim 1, wherein said divisor circuit is a divide-by-two circuit.

4. The one-shot bipolar waveform-generating device of claim 1, wherein said level adjustment circuit comprises an adjustable DC voltage and an operating amplifier.

5. The one-shot bipolar waveform-generating device of claim 4, wherein said triangle wave is adjusted by said level adjustment circuit to a reference point at 0V.

6. The one-shot bipolar waveform-generating device of claim 1, wherein said analog switch is a dual-channel analog switch.

7. The one-shot bipolar waveform-generating device of claim 6, wherein said dual-channel analog switch comprises a first analog switch and a second analog switch.

8. The one-shot bipolar waveform-generating device of claim 7, wherein said first analog switch is conducted for outputting said sawtooth wave with said positive polarity and said negative slope when said basic clock frequency is relatively high.

9. The one-shot bipolar waveform-generating device of claim 7, wherein said second analog switch is conducted for outputting said sawtooth wave with said positive polarity and said positive slope when said basic clock frequency is relatively low.

10. The one-shot bipolar waveform-generating device of claim 1, further comprising a second inverter electrically connected to said adder for inverting said bipolar sawtooth wave with said negative slope to generate a bipolar sawtooth wave with a positive slope.

11. A one-shot bipolar waveform-generating device, comprising:
   a clock waveform generation circuit generating a square wave as a basic clock frequency and a triangle wave;
   a divisor circuit electrically connected to said clock waveform generation circuit for generating a clock signal in response to said square wave;
   a one-shot circuit for generating a trigger signal;
   a clock synchronizing gate-controlled trigger generation circuit electrically connected to said divisor circuit and said one-shot circuit, and generating a gate-controlled signal with a duty cycle representing a twice of said basic clock frequency in response to said clock signal and said trigger signal, thereby a rising edge of said gate-controlled signal synchronized with a rising edge of said basic clock frequency to cut a cycle of said basic clock frequency;
   a filter electrically connected to said clock waveform generation circuit for generating a sinusoidal wave in response to said square wave;
   a level adjustment circuit electrically connected to said filter for adjusting a level of said sinusoidal wave;
   an analog switch electrically connected to said clock synchronizing gate-controlled trigger generation circuit and said level adjustment circuit to receive said square wave, and controlled by said gate-controlled signal to generate a single-cycle bipolar sinusoidal wave with a positive half cycle at a beginning thereof; and
   an inverter electrically connected to said analog switch for inverting said single-cycle bipolar sinusoidal wave with said positive half cycle at said beginning thereof to generate a single-cycle bipolar sinusoidal wave with a negative half cycle at a beginning thereof.

12. The one-shot bipolar waveform-generating device of claim 11, wherein said clock waveform generation circuit comprises two operating amplifiers.

13. The one-shot bipolar waveform-generating device of claim 11, wherein said divisor circuit is a divide-by-two circuit.

14. The one-shot bipolar waveform-generating device of claim 11, wherein said filter is a low-pass filter.

15. The one-shot bipolar waveform-generating device of claim 11, wherein said level adjustment circuit comprises an adjustable DC voltage and an operating amplifier.

16. The one-shot bipolar waveform-generating device of claim 15, wherein said sinusoidal wave is adjusted by said level adjustment circuit to a symmetrical sinusoidal wave with a reference point at 0V.

17. A one-shot bipolar waveform-generating device, comprising:
   a clock waveform generation circuit generating a square wave as a basic clock frequency and a triangle wave;
   a divisor circuit electrically connected to said clock waveform generation circuit for generating a clock signal in response to said square wave;
   an one-shot circuit for generating a trigger signal;
   a clock synchronizing gate-controlled trigger generation circuit electrically connected to said divisor circuit and said one-shot circuit, and generating a gate-controlled signal with a duty cycle representing a twice of said basic clock frequency in response to said clock signal and said trigger signal, thereby a rising edge of said gate-controlled signal synchronized with a rising edge of said basic clock frequency to cut a cycle of said basic clock frequency;
   a level adjustment circuit electrically connected to said clock synchronizing gate-controlled trigger generation circuit for adjusting a level of said square wave;
   an analog switch electrically connected to said clock synchronizing gate-controlled trigger generation circuit and said level adjustment circuit to receive said square wave, and controlled by said gate-controlled signal to generate a single-cycle bipolar square wave with a positive polarity at a beginning thereof; and
   an inverter electrically connected to said analog switch for inverting said single-cycle bipolar square wave with said positive polarity at said beginning thereof to a single-cycle bipolar square wave with a negative polarity at a beginning thereof.

18. The one-shot bipolar waveform-generating device of claim 17, wherein said clock waveform generation circuit comprises two operating amplifiers.

19. The one-shot bipolar waveform-generating device of claim 17, wherein said divisor circuit is a divide-by-two circuit.

20. The one-shot bipolar waveform-generating device of claim 17, wherein said level adjustment circuit comprises an adjustable DC voltage and an operating amplifier.

21. The one-shot bipolar waveform-generating device of claim 20, wherein said square wave is adjusted by said level adjustment circuit to a symmetrical square wave with a reference point at 0V.

22. A method for generating a one-shot bipolar waveform, comprising steps of:
   providing a square wave as a basic clock frequency, an inverted square wave, a triangle wave and a trigger signal;
   dividing said inverted square wave into a divided square wave;
   generating a control signal in response to said divided square wave and said trigger signal, wherein said control signal has a duty cycle representing a twice of said basic clock frequency, a rising edge of said control signal is synchronized with a rising edge of said basic clock frequency so as to cut a cycle of said basic clock frequency;
   adjusting a level of said triangle wave to form an adjusted triangle wave and transmitting said adjusted triangle wave to an analog switch;
   generating a sawtooth wave with a positive polarity and a negative slope and a sawtooth wave with a positive polarity and a positive slope in response to said square wave and said control signal by means of said analog switch;
   inverting said sawtooth wave with said positive polarity and said positive slope to an inverted sawtooth wave; and
   adding said inverted sawtooth wave to said sawtooth wave with said positive polarity and said negative slope to generate a bipolar sawtooth wave with a negative slope.

23. The method of claim 22, wherein said inverted square wave is divided by 2.

24. The method of claim 22, wherein said triangle wave is adjusted to a reference point at 0V.

25. The method of claim 22, wherein said analog switch is a dual-channel analog switch.

26. The method of claim 25, wherein said dual-channel analog switch has a first analog switch and a second analog switch.

27. The method of claim 26, wherein said first analog switch is conducted for outputting said sawtooth wave with said positive polarity and said negative slope when said basic clock frequency is relatively high.

28. The method of claim 26, wherein said second analog switch is conducted for outputting said sawtooth wave with said positive polarity and said positive slope when said basic clock frequency is relatively low.

29. The method of claim 22, further comprising a step of inverting said bipolar sawtooth wave with said negative slope to generate a bipolar sawtooth wave with a positive slope.

30. A method for generating a one-shot bipolar waveform, comprising steps of:
    providing a square wave as a basic clock frequency, a triangle wave and a trigger signal;
    dividing said square wave into a divided square wave;
    generating a control signal in response to said divided square wave and said trigger signal, wherein said control signal has a duty cycle representing a twice of said basic clock frequency, a rising edge of said control signal is sychronized with a rising edge of said basic clock frequency so as to cut a cycle of said basic clock frequency;
    converting said square wave into a sinusoidal wave;
    adjusting a level of said sinusoidal wave to form an adjustable sinusoidal wave and transmitting said adjusted sinusoidal wave to an analog switch; and
    generating a single-cycle bipolar sinusoidal wave with a positive half cycle at a beginning thereof in response to a control of said adjusted sinusoidal wave and said control signal by means of said analog switch.

31. The method of claim 30, wherein said square wave is divided by 2.

32. The method of claim 30, wherein said sinusoidal wave is adjusted to a symmetrical sinusoidal wave with a reference point at 0V.

33. The method of claim 30, further comprising a step of inverting said single-cycle bipolar sinusoidal wave with said positive half cycle at said beginning thereof to generate a single-cycle bipolar sinusoidal wave with a negative half cycle at a beginning thereof.

34. A method for generating a one-shot bipolar waveform, comprising steps of:
    providing a square wave as a basic clock frequency, a triangle wave and a trigger signal;
    dividing said square wave into a divided square wave;
    generating a control signal in response to said divided square wave and said trigger signal, wherein said control signal has a duty cycle representing a twice of said basic clock frequency, a rising edge of said control signal is synchronized with a rising edge of said basic clock frequency so as to cut a cycle of said basic clock frequency;
    adjusting a level of said square wave to form an adjusted square wave and transmitting said adjusted square wave to an analog switch; and
    generating a single-cycle bipolar square wave with a positive polarity at a beginning thereof in response to a control of said adjusted square wave and said control signal by means of said analog switch.

35. The method of claim 34, wherein said square wave is divided by 2.

36. The method of claim 34, wherein said square wave is adjusted to a symmetrical square wave with a reference point at 0V.

37. The method of claim 34, further comprising a step of inverting said single-cycle bipolar square wave with said positive polarity at said beginning thereof to generate a single-cycle bipolar square wave with a negative polarity at a beginning thereof.

* * * * *